United States Patent
Tanaka et al.

(10) Patent No.: US 7,489,307 B2
(45) Date of Patent: Feb. 10, 2009

(54) HANDWRITTEN INFORMATION INPUT APPARATUS

(75) Inventors: Hiroshi Tanaka, Kawasaki (JP); Katsuhiko Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 678 days.

(21) Appl. No.: 11/232,874

(22) Filed: Sep. 23, 2005

(65) Prior Publication Data

US 2006/0274944 A1 Dec. 7, 2006

(30) Foreign Application Priority Data

Jun. 7, 2005 (JP) .............................. 2005-167289

(51) Int. Cl.
*G06F 3/041* (2006.01)
*G06F 3/048* (2006.01)

(52) U.S. Cl. .................. 345/173; 715/768; 715/863

(58) Field of Classification Search ......... 345/173–178; 178/18.01–18.11; 715/768, 773, 810, 812–814, 715/821, 822, 825, 863; 382/186–189
See application file for complete search history.

(56) References Cited

U.S. PATENT DOCUMENTS

| | | | | |
|---|---|---|---|---|
| 6,938,221 | B2 * | 8/2005 | Nguyen ...................... | 715/863 |
| 7,096,432 | B2 * | 8/2006 | Huapaya et al. ............. | 715/863 |
| 2005/0022130 | A1 * | 1/2005 | Fabritius ...................... | 715/139 |
| 2005/0114797 | A1 | 5/2005 | Nguyen | |

FOREIGN PATENT DOCUMENTS

| | | |
|---|---|---|
| EP | 1 536 316 A1 | 6/2005 |
| JP | 2000-353049 A | 12/2000 |
| JP | 2004-054589 A | 2/2004 |
| WO | 01/15127 A1 | 3/2001 |

* cited by examiner

*Primary Examiner*—Jimmy H Nguyen
(74) *Attorney, Agent, or Firm*—Arent Fox LLP (57) ABSTRACT

A handwritten information input apparatus enabling the input of handwriting even at a place where a menu is displayed on a screen and enabling the operation of the menu as required is provided. The handwritten information input apparatus includes: a display unit; a coordinate input unit; a menu display unit; a handwritten input detection unit that judges whether an operator is inputting a handwritten pattern or is pointing at a menu based on the coordinate data acquired by the coordinate input unit; a menu display changing unit that changes a transparency of the menu image in accordance with a result of the judgment; a menu operation unit that performs a process associated with a menu item in the menu image in accordance with the coordinate data acquired by the coordinate input unit; and a menu operation switching unit that, in the case of the judgment as inputting of a handwritten pattern, disables the process by the menu operation unit and in the case of the judgment as pointing at the menu, enables the process by the menu operation unit.

9 Claims, 7 Drawing Sheets

HANDWRITTEN INFORMATION INPUT APPARATUS

BACKGROUND OF THE INVENTION

1. Field of the Invention

The present invention relates to a handwritten information input apparatus with a GUI screen, and more particularly relates to a handwritten information input apparatus that allows inputting and displaying of a handwritten pattern using a pointing device such as a stylus, a tablet and a mouse and that gives operating instructions for an application program by the operation of a menu on a screen.

2. Description of Related Art

Conventionally, an information processing apparatus with a GUI screen has been widely used. In the information processing apparatus with a GUI screen, the predominantly used interface is in a type of operating an object and a menu displayed on the screen by a direct instruction using a coordinate input device such as a mouse. As the coordinate input device, a device that designates coordinates on a tablet overlaid on a screen using a stylus is available, as well as a device that allows directly inputting by handwriting on a GUI screen.

As handwritten input applications, a drawing tool, an electronic white board program and the like enabling the input of handwriting are known. According to these handwritten drawing programs, a handwritten pattern written on a screen is saved and displayed, and at the same time edit commands have to be executed so as to delete or move the already-input drawn data. Therefore, both of the handwriting and the edit commands have to be input using a common coordinate input device.

Figure 8A:
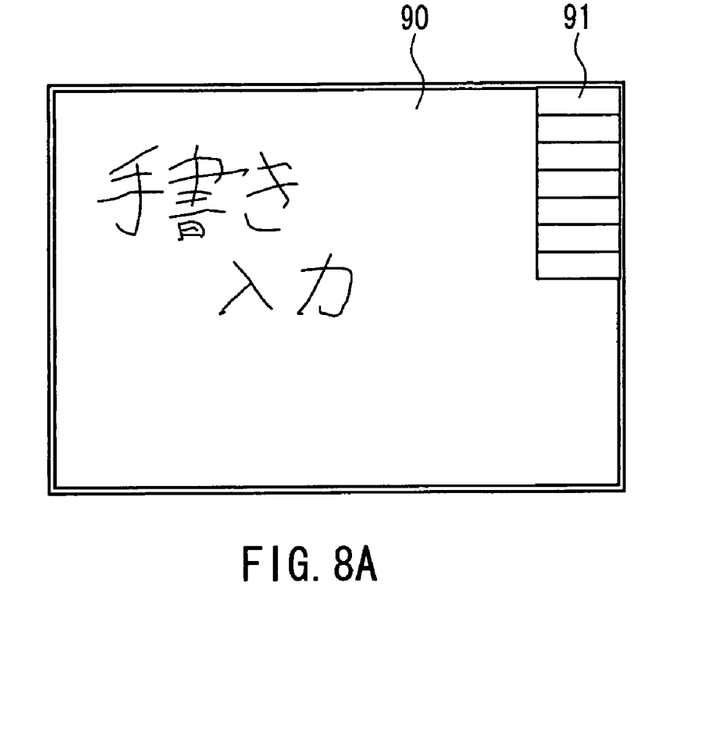
FIGS. 8A and 8B show one example of a display mode of a menu in a conventional handwritten information input apparatus.
Figure 8B:
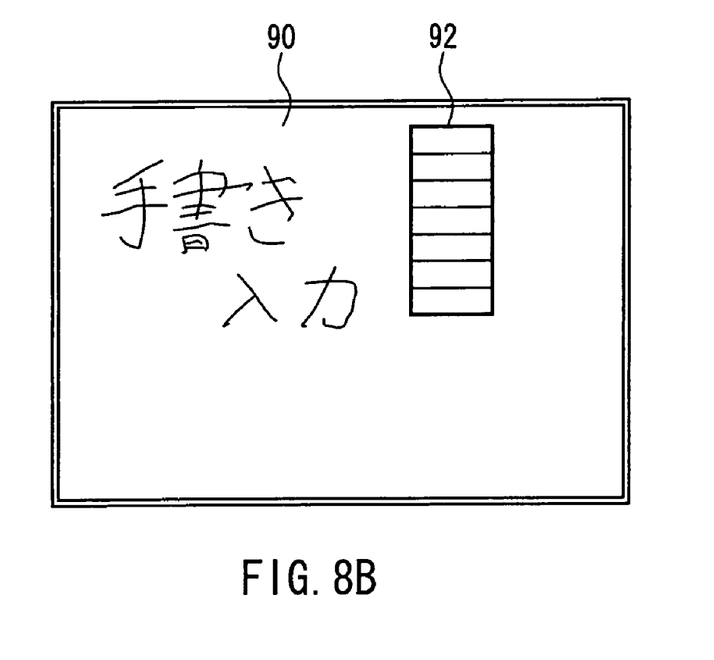

To this end, as in FIG. 8A showing a general example, the switching between a drawing mode and edit modes (e.g., a selection mode and a moving mode) is performed by selecting a menu 91 provided at an edge of an application screen 90, for example. Herein, the menu located at an edge of the screen may cause inconvenience because the moving amount between the respective operation positions is large, and therefore a floating menu 92, overlaid on the screen 90, may be used as shown in FIG. 8B. Such a floating menu is useful for enhancing the operability because the menu for selecting commands can be placed in close vicinity to the operation position on the screen for inputting of handwriting or the like.

Figure 9A:
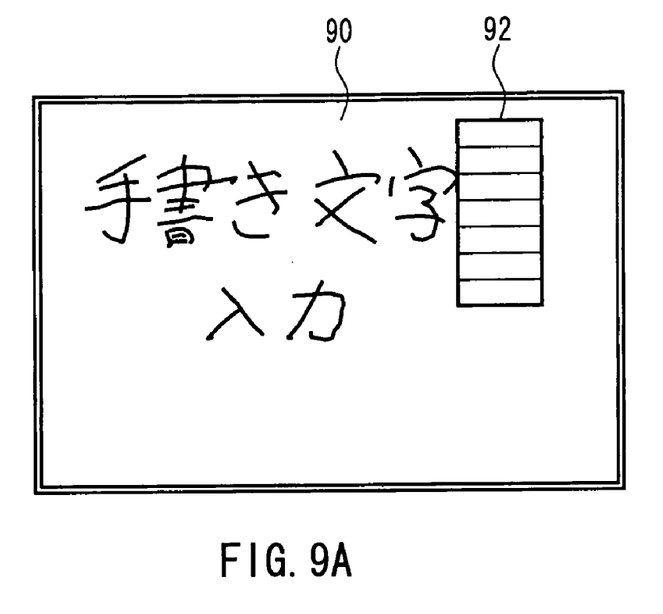
FIGS. 9A and 9B show another example of a display mode of a menu in a conventional handwritten information input apparatus.
Figure 9B:
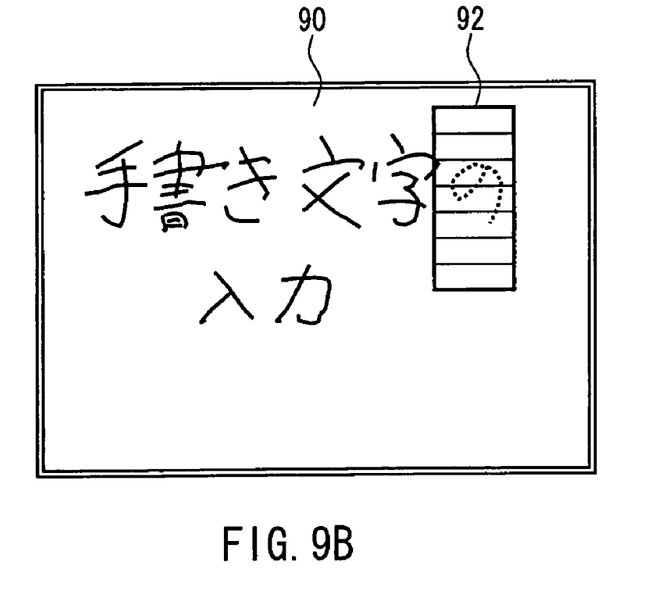

When a floating menu is arranged on the screen, however, there is a problem that the menu hides a part of the screen from view. For instance, in the example of FIG. 9A, although the character string of「手書き文字の入力」is input on the screen 90 with the handwritten pattern, the character [の] is hidden behind the floating menu 92. In order to allow a user to see the display hidden behind the menu, the floating menu 92 may be displayed in a semitransparent state as shown in FIG. 9B. As a technology analogous to this, JP 2004-54589 A discloses a transparent soft keyboard. In this way, when the menu or the like overlaid on the screen can be displayed in a semitransparent state as required, the menu will not interfere with the sight of a user on the screen, and the user can keep the menu handy and operate it easily.

SUMMARY OF THE INVENTION

In the case where the floating menu is displayed in a semitransparent state, however, there is a problem that the menu operation becomes activated when the handwriting passes above the menu during the inputting of the handwritten characters. This results in a failure of inputting handwriting there, although a background screen of the semitransparent menu is displayed. Therefore, if a user intends to input handwriting at a region where the menu is displayed during the writing of characters on an electronic white board for example, the user has to move the menu to a different place and then restart writing. Further, a user might operate the menu accidentally during the inputting of handwriting at a region in the vicinity of the menu.

Therefore, with the foregoing in mind, it is an object of the present invention to provide a handwritten information input apparatus that enables the input of handwriting even at a place where a menu is displayed on a screen and enables the operation of the menu as required.

In order to full the above-stated object, a handwritten information input apparatus of the present invention includes: a display unit having a screen; a data processing unit that processes data to be displayed on the screen; a coordinate input unit that acquires coordinate date of a position on the screen designated by an operator with a pointing device; a menu display unit that allows the screen to display a menu image; a handwritten input detection unit that makes a judgment whether the operator is inputting a handwritten pattern or is pointing at a menu based on the coordinate data acquired by the coordinate input unit and predetermined judgment criteria; a menu display changing unit that changes a transparency of the menu image displayed on the screen in accordance with a result of the judgment by the handwritten input detection unit; a menu operation unit that performs a process associated with a menu item in the menu image in accordance with the coordinate data acquired by the coordinate input unit; and a menu operation switching unit that, in the case where the handwritten input detection unit judges that the operator is inputting a handwritten pattern, disables the process by the menu operation unit and in the case where the handwritten input detection unit judges that the operator is pointing at the menu, enables the process by the menu operation unit.

With this configuration, in the case where the handwritten input detection unit judges that the operator is inputting a handwritten pattern, the menu operation switching unit disables the process by the menu operation unit and in the case where the handwritten input detection unit judges that the operator is pointing at the menu, the menu operation switching unit enables the process by the menu operation unit. Thereby, if the handwritten pattern input by the operator enters the display region of the menu image, the menu operation does not become activated accidentally because the process by the menu operation unit is disabled. On the other hand, in the case where the operator wishes to operate the menu, a required menu operation can be activated because the menu operation switching unit enables the process by the menu operation unit. Thereby, a handwritten information input apparatus enabling the input of handwriting even at a place where a menu is displayed on a screen and enabling the operation of the menu as required can be provided.

In the handwritten information input apparatus of the present invention, preferably, in the case where the handwritten input detection unit judges that the operator is pointing at the menu, the menu display changing unit changes the transparency of the menu image displayed by the menu display unit to a predetermined transparency for menu operation that allows the operator to recognize at least menu items in the menu image, and in the case where the handwritten input detection unit judges that the operator is inputting a handwritten pattern, the menu display changing unit changes the transparency of the menu image displayed by the menu display unit to a predetermined transparency for writing that is higher than the transparency for menu operation.

With this configuration, in the case where the operator is inputting a handwritten pattern, the menu image can be displayed in a state closer to transparent. Therefore, the operator can input the handwritten pattern in a state allowing the operator to see a background image including the handwritten pattern. In the case where the operator intends to operate the menu, the menu image can be displayed in a state closer to non-transparent. Therefore, the menu image can be displayed clearly, so that it is easy for the operator to see the displayed menu.

In the handwritten information input apparatus of the present invention, preferably, the transparency for writing is completely transparent. With this configuration, the operator can input handwriting in a state where the menu is not displayed at all.

In the handwritten information input apparatus of the present invention, preferably, after a certain period of time has elapsed after the acquiring of the coordinate data by the coordinate input unit is suspended, the menu display changing unit sets the transparency of the menu image displayed by the menu display unit at a transparency between the transparency for menu operation and the transparency for writing. With this configuration, when the operator starts the input, the menu image is displayed with a transparency between the transparency for menu operation and the transparency for writing. Therefore, in either case where the operator intends to subsequently input a handwritten pattern or operate the menu, it is relatively easy for the operator to see the display.

In the handwritten information input apparatus of the present invention, preferably, the coordinate input unit includes a tablet capable of remote sensing, and detects coordinates of a position of the pointing device before the designating of the coordinates with the pointing device. In the case where the coordinates of the position detected by the coordinate input unit is within or in the vicinity of a display region of the menu image, the menu display changing unit sets the transparency of the menu image displayed by the menu display unit at a transparency between the transparency for menu operation and the transparency for writing.

With this configuration, in the case where the coordinates of the position of the pointing device are within or in the vicinity of a display region of the menu image, the menu image can be displayed with a transparency between the transparency for menu operation and the transparency for writing. Therefore, in either case where the operator starts to input a handwritten pattern or operate the menu, it is relatively easy for the operator to see the display.

In the handwritten information input apparatus of the present invention, preferably, during a period of time between starting of the acquiring of the coordinate data by the coordinate input unit and generation of the judgment by the handwritten input detection unit as to whether the operator is inputting a handwritten pattern or is pointing at the menu, the menu display changing unit sets the transparency of the menu image displayed by the menu display unit at a transparency between the transparency for menu operation and the transparency for writing.

With this configuration, during a period of time until the judgment is made as to whether the operator is inputting a handwritten pattern or is pointing at the menu, the menu image is displayed with a transparency between the transparency for menu operation and the transparency for writing. Therefore, immediately after the operator starts the inputting, it is relatively easy for the operator to see the display in either case where the operator intends to input a handwritten pattern or operate the menu.

In the handwritten information input apparatus of the present invention, the handwritten input detection unit may judge whether the operator is inputting a handwritten pattern or is pointing at the menu, based on at least one of the following criteria as the judgment criteria:

a starting position of a stroke is within a display region of the menu image or not;

a distance from the starting position of the stroke to a current position is not less than a predetermined threshold value or not;

a length of a track from the starting position of the stroke to the current position is not less than a predetermined threshold value or not;

a writing time of the track from the starting position of the stroke to the current position is not less than a predetermined threshold value or not;

an immediately preceding stroke is a handwritten pattern or not; and inputting of the stroke starts within a predetermined time after completion of input of the immediately preceding stroke or not.

In the handwritten information input apparatus of the present invention, preferably, the handwritten input detection unit judges whether the operator is inputting a handwritten pattern or is pointing at the menu, based on at least one of the following criteria as the judgment criteria: a distance from a starting position of a stroke to a current position is not less than a predetermined threshold value or not; and a length of a track from the starting position of the stroke to the current position is not less than a predetermined threshold value or not. If an immediately preceding stroke is a handwritten pattern and inputting of the stroke starts within a predetermined time after completion of input of the immediately preceding stroke, values of the threshold values may be changed.

Further, in order to fulfill the above-stated object, a program of the present invention controls operations of a handwritten information input apparatus including a display unit having a screen and a coordinate input unit that acquires coordinate data of a position on the screen designated by an operator with a pointing device. The program makes a processor of the handwritten information input apparatus execute a procedure including: a data processing process of processing data to be displayed on the screen; a menu display process of making the screen display a menu image; a handwritten input detection process of making a judgment whether the operator is inputting a handwritten pattern or is pointing at a menu based on the coordinate data acquired by the coordinate input unit and predetermined judgment criteria; a menu display changing process of changing a transparency of the menu image displayed on the screen in accordance with a result of the judgment by the handwritten input detection process; a menu operation process of performing a process associated with a menu item in the menu image in accordance with the coordinate data acquired by the coordinate input unit; and a menu operation switching process of, in the case where the handwritten input detection process judges that the operator is inputting a handwritten pattern, disabling the menu operation process and in the case where the handwritten input detection process judges that the operator is pointing at the menu, enabling the menu operation process.

Further, in order to fulfill the above-stated object, a program recording medium of the present invention has stored thereon a program that controls operations of a handwritten information input apparatus including a display unit having a screen and a coordinate input unit that acquires coordinate data of a position on the screen designated by an operator with a pointing device. The program makes a processor of the handwritten information input apparatus execute a procedure including: a data processing process of processing data to be displayed on the screen; a menu display process of making the screen display a menu image; a handwritten input detection process of making a judgment whether the operator is inputting a handwritten pattern or is pointing at a menu based on the coordinate data acquired by the coordinate input unit and predetermined judgment criteria; a menu display changing process of changing a transparency of the menu image displayed on the screen in accordance with a result of the judgment by the handwritten input detection process; a menu operation process of performing a process associated with a menu item in the menu image in accordance with the coordinate data acquired by the coordinate input unit; and a menu operation switching process of, in the case where the handwritten input detection process judges that the operator is inputting a handwritten pattern, disabling the menu operation process and in the case where the handwritten input detection process judges that the operator is pointing at the menu, enabling the menu operation process.

According to the present invention, a handwritten information input apparatus that enables the input of handwriting even at a place where a menu is displayed on a screen and enables the operation of the menu as required can be provided.

DETAILED DESCRIPTION OF THE INVENTION

The following describes one embodiment of a handwritten information input apparatus according to the present invention.

The handwritten information input apparatus according to the present embodiment includes a so-called tablet type personal computer enabling the input of handwriting on a screen using a pen, a personal computer or a PDA equipped with a display tablet and so on.

Figure 1:
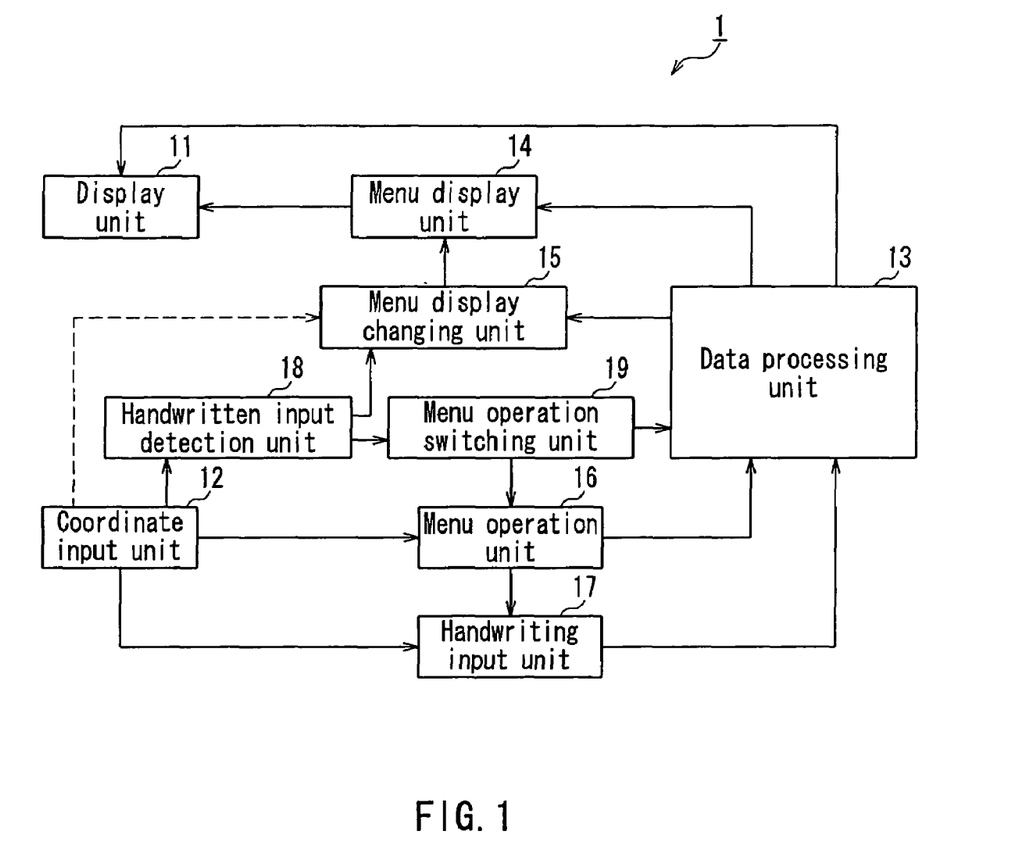
FIG. 1 is a block diagram schematically showing the functional configuration of a handwritten information input apparatus according to one embodiment of the present invention.

FIG. 1 is a block diagram showing the functional configuration of a handwritten information input apparatus 1 of the present embodiment. As shown in FIG. 1, the handwritten information input apparatus 1 includes: a display unit 11; a coordinate input unit 12; a data processing unit 13; a menu display unit 14; a menu display changing unit 15; a menu operation unit 16; a handwriting input unit 17; a handwritten input detection unit 18; and a menu operation switching unit 19.

The display unit 11 can be embodied with a flat display device such as a liquid crystal display. The coordinate input unit 12 can be embodied with a transparent tablet that is superimposed on the display unit 11. In other words, in the handwritten information input apparatus 1, the display unit 11 and the coordinate input unit 12 are configured as a display-integrated tablet. Herein, in FIG. 1, the data processing unit 13, the menu display unit 14, the menu display changing unit 15, the menu operation unit 16, the handwriting input unit 17, the handwritten input detection unit 18 and the menu operation switching unit 19 are illustrated as the independent functional blocks. However, the functions of these blocks can be embodied by making a CPU of the handwritten information input apparatus operate in accordance with predetermined programs (operating system and application program). That is, discrete hardware may not always exist corresponding to each of these blocks.

Figure 2:
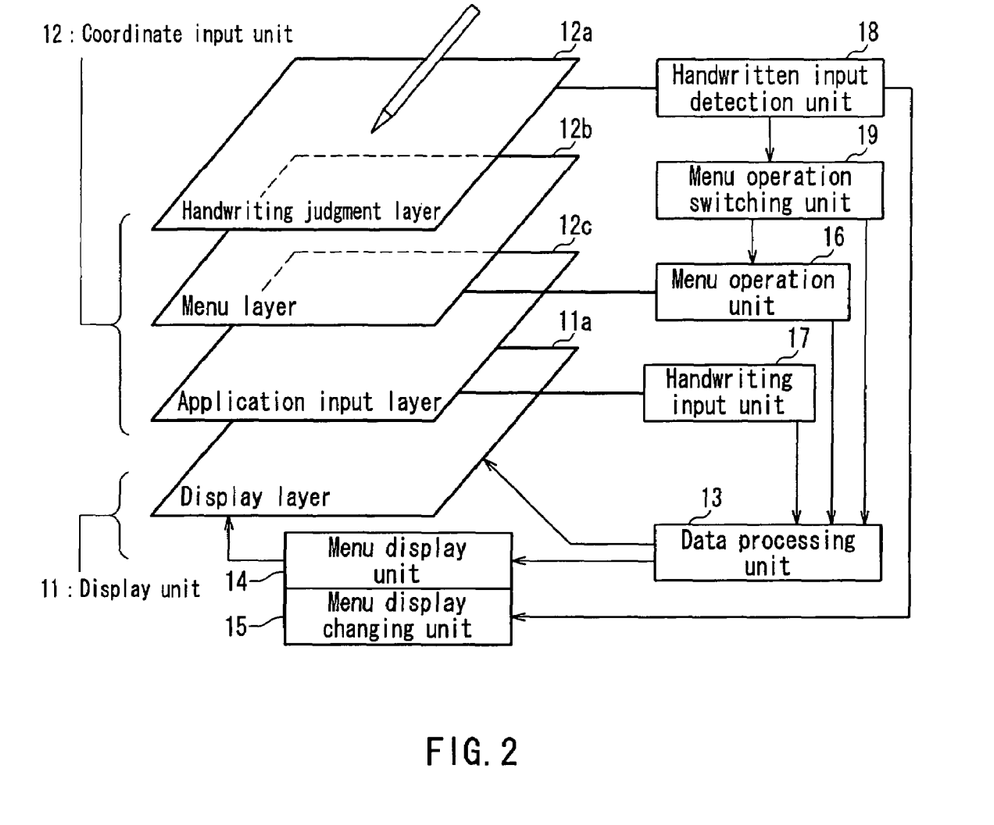
FIG. 2 is a block diagram showing the relationship between a display unit, a coordinate input unit and other functional blocks in a handwritten information input apparatus according to one embodiment of the present invention.

Referring now to FIG. 2, the processing at the respective blocks of FIG. 1 of the handwritten information input apparatus 1 when an operator performs inputting using a pen will be described below. As shown in FIG. 2, it is assumed that the coordinate input unit 12 (a tablet) and the display unit 11 (a display) provide a handwriting judgment layer 12a, a menu layer 12b, an application input layer 12c and a display layer 11a. The handwriting judgment layer 12a is mainly embodied by the handwritten input detection unit 18. The menu layer 12b is mainly embodied by the menu operation unit 16. The application input layer 12c is mainly embodied by the handwriting input unit 17. The display layer 11a is mainly embodied by the data processing unit 13, the menu display unit 14 and the menu display changing unit 15.

When the operator performs inputting to the coordinate input unit 12 using a pen, firstly, the handwriting judgment layer 12a as the uppermost layer acquires coordinate information of the information input with the pen. The acquired coordinate information is passed from the handwriting judgment layer 12a to the handwritten input detection unit 18. Based on this coordinate information, the handwritten input detection unit 18 judges whether the operator is inputting a handwritten pattern or not. Note here that "a handwritten pattern" of the present invention refers to handwriting that an operator draws with a pen so as to input characters, signs or graphics. The input for a menu operation (e.g., tapping on the menu) is not a handwritten pattern.

If the handwritten input detection unit 18 judges that the operator is inputting a handwritten pattern, the menu operation switching unit 19 instructs the menu operation unit 16 to ignore the input coordinates. Thereby, the coordinate information passes through the menu layer 12b (i.e., not being subjected to any process by the menu operation unit 16) so as to reach the application input layer 12c, where the coordinate information is subjected to the process by the handwriting input unit 17.

On the other hand, if the handwritten input detection unit 18 judges that the input by the operator is not a handwritten pattern, the coordinate information is passed to the menu layer 12*b*, and the menu operation unit 16 uses the coordinate information for the menu operation. Herein, in the case where the position indicated by the coordinate information is not included in a region where the menu is displayed at the display unit 11 (hereinafter called a menu region), the coordinate information is passed from the menu layer 12*b* to the lower application input layer 12*c*. On the other hand, in the case where the position indicated by the coordinate information is included in the menu region, the coordinate information is used for the menu operation and is not passed to the application input layer 12*c*.

The progress of the above-stated process is displayed at the display layer 11*a* through the data processing unit 13, while the display mode of the menu is changed as required by the menu display unit 14 and the menu display changing unit 15. That is, the data processing unit 13 performs data processing in order to display various images (including the handwriting of a handwritten pattern) other than the menu on the screen of the display unit 11, while the menu display unit 14 performs data processing required for displaying the menu image on the screen of the display unit 11.

The following describes two examples of the procedure by the handwritten input detection unit 18 for judging whether a handwritten pattern is input or not.

FIRST EXAMPLE

In the first example, the handwritten input detection unit 18 acquires the sequence of coordinates (a stroke) from the pen-down to the current state and judges whether the input by the operator is a handwritten pattern or not, based on three judgment criteria of (1) the distance from the starting position (pen-down position) to the current coordinates position, (2) the length of the track and (3) the writing time of the track. That is, in this first example, the handwritten input detection unit 18 can make a judgment in the units of strokes during the writing of each stroke as to whether each stroke is a handwritten pattern or not.

Figure 3:
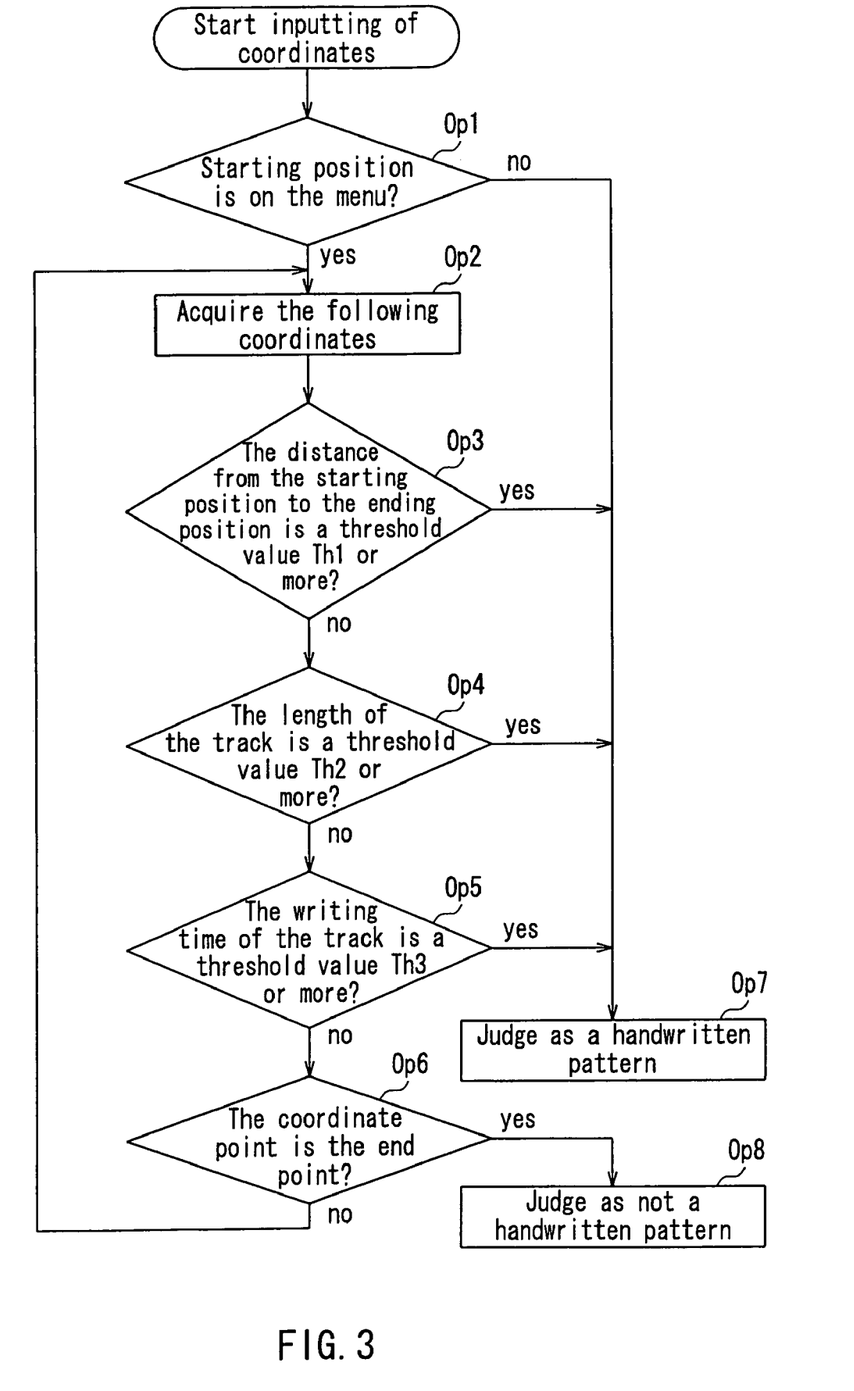
FIG. 3 is a flowchart showing one example of the operation by a handwritten input detection unit included in the handwritten information input apparatus according to one embodiment of the present invention.

FIG. 3 is a flowchart of the judgment procedure in the first example. When an operator starts to input at a coordinate point, the handwritten input detection unit 18 receives coordinate information of the starting position (pen-down position) from the coordinate input unit 12, and judges whether the starting position is in the menu region or not (Op1). If the starting position is not in the menu region (the result of Op1 is no), the handwritten input detection unit 18 judges that the input by the operator is a handwritten pattern (Op7). On the other hand, if the starting position is in the menu region (the result of Op1 is yes), the handwritten input detection unit 18 receives the following coordinate information that the coordinate input unit 12 samples sequentially during the writing by the operator (Op2).

The handwritten input detection unit 18 judges whether the distance of the straight line from the starting position to the position indicated by the coordinate information received at Op2 is not less than a predetermined threshold value (Th1) or not (Op3). In the case where the result of Op3 is yes, the handwritten input detection unit 18 judges that the input by the operator is a handwritten pattern (Op7). On the other hand, if the result of Op3 is no, the handwritten input detection unit 18 judges whether the length of the track from the starting position to the position indicated by the coordinate information received at Op2 is not less than a predetermined threshold value (Th2) or not (Op4). In the case where the result of Op4 is yes, the handwritten input detection unit 18 judges that the input by the operator is a handwritten pattern (Op7). In this way, both of the distance of the straight line from the starting position and the length of the track are checked, whereby the judgment concerning a handwritten pattern or not can be made correctly even in the case where a circle or the like is drawn.

On the other hand, if the result of Op4 is no, the handwritten input detection unit 18 judges whether the writing time of the track from the starting position to the position indicated by the coordinate information received at Op2 is not less than a predetermined threshold value (Th3) or not (Op5). In the case where the result of Op5 is yes, the handwritten input detection unit 18 judges that the input by the operator is a handwritten pattern (Op7). If the result of Op5 is no, the handwritten input detection unit 18 judges whether the coordinate information received at Op2 shows the end point of the stroke or not (Op6). In the case of showing the end point, the handwritten input detection unit 18 judges that the input by the operator is not a handwritten pattern (Op8). On the other hand, in the case of not showing the end point, the procedure returns to Op2, where the handwritten input detection unit 18 receives the next coordinate information and repeats the procedure of Op3 or later.

Note here that the three threshold values of Th1 to Th3 can be set freely depending on the situation. As a preferable example, in the case where the display unit 11 is a 12-inch display with an aspect ratio of 1,024 pixels×768 pixels for example (input coordinate unit also is 1,024 pixels×768 pixels), it can be considered that effective threshold values of Th1, Th2 and Th3 are 5 pixels, 10 pixels and 0.5 second, respectively. This is just an example, and the embodiment of the present invention is not limited to this.

In this first example, at Op1, the judgment whether the input by the operator is a handwritten pattern or not is made based on whether the starting position is in the menu region or not. This is a non-limiting example, and the judgment can be made based on the positional relationships between the starting position or the like and the menu region.

SECOND EXAMPLE

The flow of the basic procedure in the second example is the same as that of the first example, but the handwritten input detection unit 18 of the second example has a memory for storing the judgment result as to whether the immediately preceding stroke is a handwritten pattern or not, and the threshold values at Op3 and Op4 (Th1 and Th2) are changed based on the elapsed time from the immediately preceding coordinate input and the judgment result as to whether the immediately preceding stroke is a handwritten pattern or not.

Figure 4:
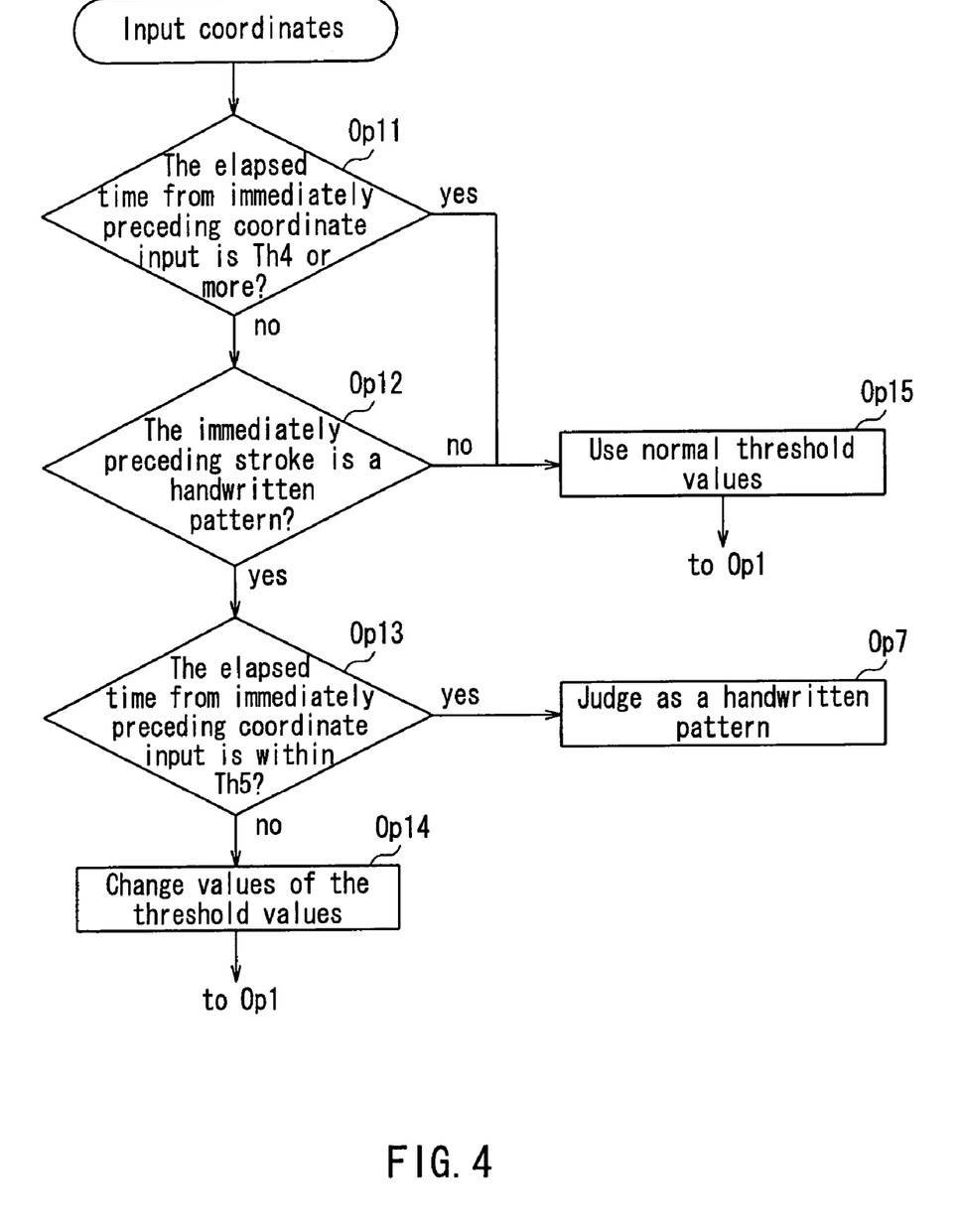
FIG. 4 is a flowchart showing another example of the operation by a handwritten input detection unit.

In this second example, when an operator starts to input at a coordinate point, the handwritten input detection unit 18 performs the procedure from Op11 to Op16 shown in FIG. 4 prior to Op1 shown in FIG. 3. That is, when the operator starts the coordinate input procedure, the handwritten input detection unit 18 judges whether the elapsed time from the immediately preceding coordinate input is not less than a predetermined threshold value (Th4) or not (Op11). If the judgment result of Op11 is yes, normal threshold values are used as Th1 and Th2 (Op15). That is, the values of Th1 and Th2 are not changed at Op15, and the procedure goes to Op1 (see FIG. 3). On the other hand, if the judgment result of Op11 is no, the handwritten input detection unit 18 refers to the above-stated memory, and if the immediately preceding stroke is not a handwritten pattern (the result of Op12 is no), the procedure goes to Op15 similarly to the above. On the other hand, if the immediately preceding stroke is a handwritten pattern (the result of Op12 is yes), the handwritten input detection unit 18 judges whether the elapsed time from the immediately preceding coordinate input to the current coordinate input is within a predetermined threshold value (Th5) or not (Op13). Herein, Th5 is shorter than Th4 and it can be considered that Th4 may be 1 second and Th5 may be 0.2 second for example. This is just an example, and the embodiment of the present invention is not limited to this example.

If the result of Op13 is yes, the current coordinate input starts in a short time (Th5) after the completion of the writing of the stroke that is input immediately before as a handwritten input pattern. Therefore, the handwritten input detection unit 18 judges that the input by the operator is a handwritten pattern (Op7). This is based on the tendency that when an operator inputs a handwritten pattern, he/she continuously inputs a plurality of strokes without long time intervals therebetween.

On the other hand, if the result of Op13 is no, the handwritten input detection unit 18 changes the values of Th1 and Th2 (Op14), and then performs the procedure of Op1 or later shown in FIG. 3. More specifically, at Op14, the handwritten input detection unit 18 reduces each of the values of Th1 and Th2, used at Op3 and Op4, by predetermined values. For instance, in the case where Th1 and Th2 are set at 5 pixels and 10 pixels as previously described, these threshold values may be reduced by the respective predetermined values so that Th1 may be 3 pixels and Th2 may be 6 pixels. Thereby, during the continuous input of a handwritten pattern, the menu operation unit 16 can be made in a less reactive state. Note here that the changing amounts of Th1 and Th2 may be different from each other as stated above, or may be the same.

That is the explanation of the examples of the procedure by the handwritten input detection unit 18 of judging a handwritten pattern. However, procedures other than these may be performed for judging a handwritten pattern.

As stated above, the handwritten input detection unit 18 performs the judgment procedure as to whether the input by the operator is a handwritten pattern or not. Thereafter, if the input is judged to be a handwritten pattern, the menu operation switching unit 19 gives an instruction to the menu operation unit 16 so as not to react to the input by the operator. Thereby, a stroke of the handwritten pattern enters the menu region during the input of characters, signs and graphics, the menu operation does not become activated accidentally. On the other hand, if the input is judged not to be a handwritten pattern, the menu operation switching unit 19 gives an instruction to the menu operation unit 16 so as to react to the input by the operator. Thereby, the operation with a pen for operating the menu is never recognized accidentally as a handwritten pattern.

The menu operation unit 16 judges whether the position of the coordinates input by the operator with the pen is in the menu region or not, and if that is in the menu region, the menu operation unit 16 passes the menu item corresponding to the coordinates to the data processing unit 13. The judgment concerning the inside or outside of the menu region may be made based on whether the end point of the input stroke is in the menu region or not, for example.

The handwriting input unit 17 passes the input coordinate information to the application program that is being executed by the data processing unit 13. The menu display unit 14 and the menu display changing unit 15 control the display attributes of the menu, which was then displayed on the screen of the display unit 11. The details as to what is to be displayed on the menu and how they are laid out, which are different depending on the executed application program, are specified by the data processing unit 13. In the present embodiment, the menu display unit 14 and the menu display changing unit 15 have functions of resetting the color and the transparency of the menu image passed from the data processing unit 13 and enabling the display of it on the screen of the display unit 11.

Figure 5:
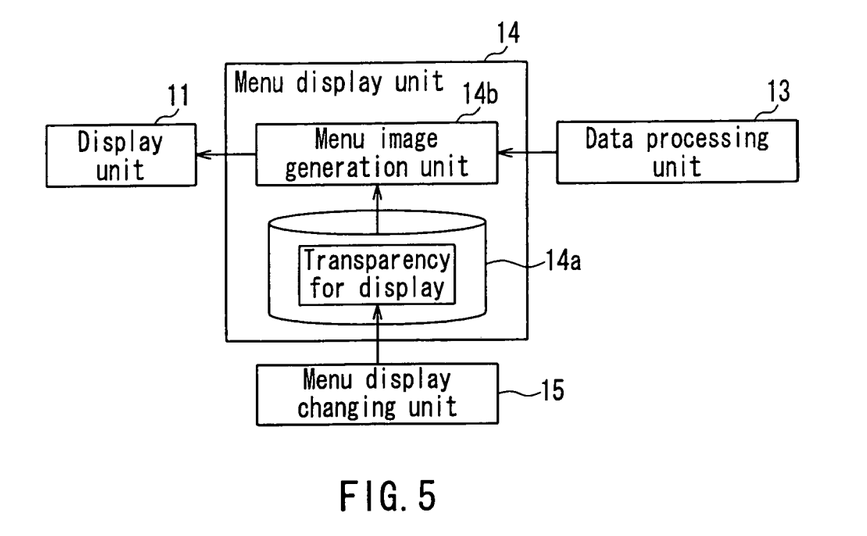
FIG. 5 is a block diagram showing one example of the configuration of a menu display unit included in a handwritten information input apparatus according to one embodiment of the present invention.

FIG. 5 shows one example of the configuration of the menu display unit 14. The menu display unit 14 includes a memory 14a and a menu image generation unit 14b. The menu display changing unit 15 makes the memory 14a store a transparency. The menu image generation unit 14b changes a transparency of the menu image passed from the data processing unit 13 to the transparency stored in the memory 14a and makes the display device display the image. The menu image generation unit 14b changing the transparency of the menu image can be embodied by an image processing program. Herein, the specific value of the transparency is set by the menu display changing unit 15 and the menu image generation unit 14b simply refers to the value set as the transparency.

The following describes a specific operation of the menu image generation unit 14b. When a menu image and its background image are given, the menu image generation unit 14b generates a new image based on the value of the transparency stored in the memory 14a. A value (pixel value) of a color of one point (one pixel) on the image is represented with RGB values and each of the RGB values can range from 0 to 255.

Herein, it is assumed concerning one point in the menu region that the pixel values (R, G, B) of its background image are (R1, G1, B1) and the pixel values (R, G, B) of the menu image are (R2, G2, B2). The transparency α is $0 \leq \alpha \leq 1$. Then, the menu image generation unit 14b calculates the pixel values (RD, GD, BD) to be displayed at the display unit 11 by the following formula:

$$RD = R2 \times \alpha + R1 \times (1-\alpha)$$

$$GD = G2 \times \alpha + G1 \times (1-\alpha)$$

$$BD = B2 \times \alpha + B1 \times (1-\alpha).$$

That is, in the case of α=0, the menu image is transparent, and the background image only is visible in the menu region. In the case of α=1, the menu image is not transparent, and the menu image only is visible in the menu region and the background image is totally invisible.

Therefore, in the case where the handwritten input detection unit 18 judges that the input by the operator is a handwritten pattern, the menu display changing unit 15 may make the memory 14a store 0 as the transparency α, whereby the menu image becomes invisible at the display unit 11. As a result, when the operator intends to input a handwritten pattern, the menu image is not displayed, but the background image including the handwriting of the handwritten pattern becomes visible. Therefore, the menu image does not interfere with the inputting by handwriting. Further, in this case, the menu operation switching unit 19 gives an instruction to the menu operation unit 16 so as not to react to the input by the operator as stated above, and therefore even when a stroke input by the operator enters the menu region, the menu operation never becomes activated accidentally.

On the other hand, in the case where the handwritten input detection unit 18 judges that the input by the operator is not a handwritten pattern, the menu display changing unit 15 may make the memory 14a store 1 as the transparency α, whereby the menu image is displayed at the display unit 11. Further, in this case, the menu operation switching unit 19 gives an instruction to the menu operation unit 16 so as to react to the input by the operator. Thereby, in the case where the input by the operator is not a handwritten pattern, the menu image is displayed so that the operator can operate the menu.

Figure 6:
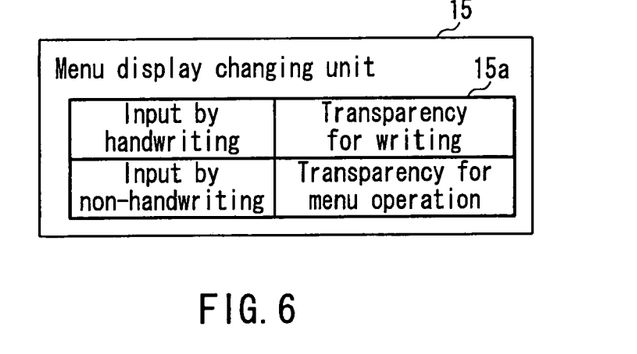
FIG. 6 is a block diagram showing one example of the configuration of a menu display changing unit included in a handwritten information input apparatus according to one embodiment of the present invention.

As stated above, the menu display changing unit 15 receives the judgment result by the handwritten input detection unit 18 and makes the memory 14a store the transparency. For this purpose, the menu display changing unit 15 has a memory 15a therein as shown in FIG. 6. In this memory 15a, transparencies $\alpha_1$ and $\alpha_2$ are set beforehand, where $\alpha_1$ is the transparency (called "transparency for writing") when the judgment result by the handwritten input detection unit 18 shows a handwritten pattern and $\alpha_2$ is the transparency (called "transparency for menu operation") when the judgment result does not show a handwritten pattern. That is, in order to realize the above-stated example, $\alpha_1$ and $\alpha_2$ may be set at 0 and 1, respectively.

Note here that the values of $\alpha_1$ and $\alpha_2$ are not limited to 0 or 1. For instance, as another preferred example, the menu image may be displayed on the screen of the display unit 11 with a degree of transparency allowing the operator to know at least the existence position of the menu image. Thereby, the menu image does not interfere with the input of a handwritten pattern, and in the case where the operator wishes the operation of the menu after the completion of the input of the handwritten pattern, he/she can easily know where the menu is placed. To realize this, a decimal of about 0.1 for example may be set as $\alpha_1$. Similarly, as for $\alpha_2$ that is the transparency for menu operation used in the case where the input by the operator is judged not to be a handwritten pattern, the value of $\alpha_2$ does not always have to be 1, and this may be set at a degree of transparency allowing the operator to recognize at least the menu items in the menu image (e.g., about 0.9).

Figure 7:
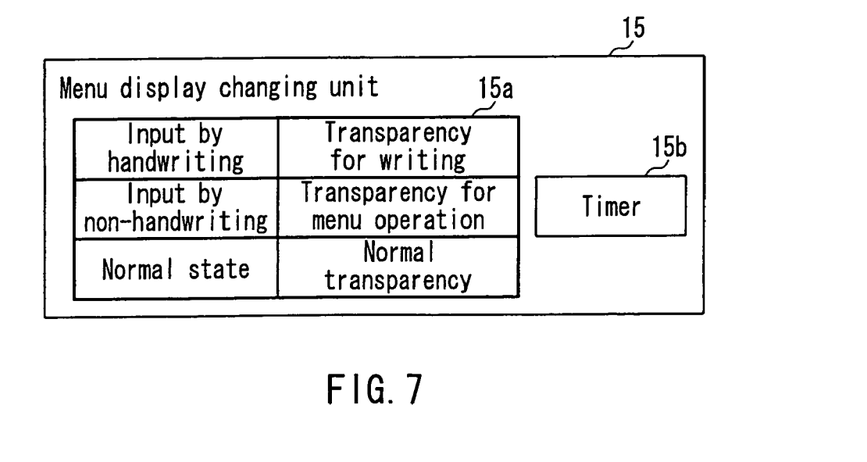
FIG. 7 is a block diagram showing another example of the configuration of a menu display changing unit included in a handwritten information input apparatus according to one embodiment of the present invention.

In the above explanation, the transparency is changed between two different values during some input operation by the operator based on whether the input by the operator is a handwritten pattern or not. In addition to this, when a certain period of time has elapsed after the completion of the input by the operator, the transparency of the menu may be changed to a third transparency. For instance, as shown in FIG. 7, "normal transparency" may be set in the memory 15a in the menu display changing unit 15 as well as the above-stated "transparency for writing" and "transparency for menu operation", where the normal transparency is used after a certain period of time has elapsed after the completion of the input by the operator. As the normal transparency, a decimal of 0.5 for example may be set as a value between the transparency for writing and the transparency for menu operation.

In this case, however, there is a need to detect that a certain period of time has elapsed after the completion of the coordinate input. Then, as shown in FIG. 7, a timer 15b may be further provided in the menu display changing unit 15. The handwritten input detection unit 18 notifies the menu display changing unit 15 of the timing when the coordinate input has completed. When the menu display changing unit 15 is notified of this, the measurement by the timer 15b starts, and after a certain period of time has elapsed, the value of the normal transparency $\alpha_3$ stored in the memory 15a is set at the memory 14a of the menu display unit 14. Thereby, when a certain period of time has elapsed after the completion of the coordinate input by the operator, the menu can be displayed with an intermediate transparency between the transparency for writing and the transparency for menu operation.

As still another preferable embodiment, in the case where the coordinate input unit 12 is embodied with a tablet capable of remote sensing, when the tablet detects that a pen becomes closer to the menu region in a non-contact manner, the menu display changing unit 15 makes the menu image displayed with a degree of transparency allowing the operator to read the menu items (called "proximity transparency"). For instance, in the case of a stylus, a remote sensing function allowing the coordinates of the stylus to be detected even when the stylus is away from the tablet enables the detection of a pointer position of the stylus. Such pointer position information is detected by the coordinate input unit 12 and is transferred to the menu display changing unit 15 as shown by the dotted line of FIG. 1.

As the above-stated "proximity transparency", it is preferable that the transparency $\alpha$ is set lower than the above-stated "transparency for writing", lower than or almost equal to the "normal transparency", and higher than the "transparency for menu operation". Thereby, when an operator brings a pen close to the tablet, the menu image can be displayed with a transparency making the menu items readable, and therefore when the operator starts to input by handwriting with the pen, the menu does not interfere with the writing. Further, in the case where the operator wishes to operate the menu, he/she can recognize the menu item to be selected easily. Note here that the tablet capable of remote sensing includes an electromagnetic induction type (electromagnetic delivering and receiving action type) tablet for example, which is a non-limiting example, though.

In the case of the coordinate input by the operator not only with a pen but also with a pointing device such as a mouse, when the operator brings a cursor of the mouse close to the menu region, it is preferable that the coordinate input unit 12 detects the approach of the mouse cursor to the menu region and makes the transparency of the menu region in a state of making the menu items readable (proximity transparency) similarly to the above.

On the other hand, in the case where the coordinate input unit 12 is embodied with a tablet incapable of remote sensing, the judgment concerning the input of a handwritten pattern or not may be enabled only after a certain period of time has elapsed after the pen actually contacts with the tablet (see FIG. 3). For that reason, in the case of a tablet incapable of remote sensing, during a time period between the starting of the input by the operator with a pen and the generation by the handwritten input detection unit 18 of the judgment result of a handwritten pattern or not, it is preferable that the menu image is displayed with a degree of transparency making the menu items readable (proximity transparency). Regarding the "proximity transparency" in this case also, it is preferable that the transparency a is set lower than the above-stated "transparency for writing", lower than or almost equal to the "normal transparency", and higher than the "transparency for menu operation". Thereby, when an operator starts the inputting to the tablet with a pen, the menu image can be displayed with a transparency making the menu items readable until the judgment result concerning a handwritten pattern or not is generated. Therefore even if the input by the operator is a handwritten pattern, the menu does not interfere with the writing. Also, even in the case where the operator wishes to operate the menu, he/she can recognize the menu item to be selected easily. Then, in the case where the handwritten input detection unit 18 judges that the input is a handwritten pattern, the transparency of the displayed menu image is changed to the "transparency for writing" having a higher transparency. On the other hand, in the case where the input is not judged as a handwritten pattern, the transparency of the displayed menu image is changed to the "transparency for menu operation" having a lower transparency. Herein, as the tablet incapable of remote sensing, a resistive film type, an analogue capacitive coupling type, a surface acoustic wave type device or the like is known. However, these types are just preferred examples, and the tablets applicable to the present invention are not limited to these types of devices.

The present invention is applicable to a handwritten information input apparatus enabling the input of handwriting even at a place where a menu is displayed on a screen and enables the operation of the menu as required.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A handwritten information input apparatus, comprising:
   a display unit having a screen;
   a data processing unit that processes data to be displayed on the screen;
   a coordinate input unit that acquires coordinate data of a position on the screen designated by an operator with a pointing device;
   a menu display unit that allows the screen to display a menu image;
   a handwritten input detection unit that makes a judgment whether the operator is inputting a handwritten pattern or is pointing at a menu based on the coordinate data acquired by the coordinate input unit and predetermined judgment criteria;
   a menu display changing unit that changes a transparency of the menu image displayed on the screen in accordance with a result of the judgment by the handwritten input detection unit;
   a menu operation unit that performs a process associated with a menu item in the menu image in accordance with the coordinate data acquired by the coordinate input unit; and
   a menu operation switching unit that, in the case where the handwritten input detection unit judges that the operator is inputting a handwritten pattern, disables the process by the menu operation unit and in the case where the handwritten input detection unit judges that the operator is pointing at the menu, enables the process by the menu operation unit.

2. The handwritten information input apparatus according to claim 1,
   wherein in the case where the handwritten input detection unit judges that the operator is pointing at the menu, the menu display changing unit changes the transparency of the menu image displayed by the menu display unit to a predetermined transparency for menu operation that allows the operator to recognize at least menu items in the menu image, and
   in the case where the handwritten input detection unit judges that the operator is inputting a handwritten pattern, the menu display changing unit changes the transparency of the menu image displayed by the menu display unit to a predetermined transparency for writing that is higher than the transparency for menu operation.

3. The handwritten information input apparatus according to claim 2, wherein the transparency for writing is completely transparent.

4. The handwritten information input apparatus according to claim 2, wherein after a certain period of time has elapsed after the acquiring of the coordinate data by the coordinate input unit is suspended, the menu display changing unit sets the transparency of the menu image displayed by the menu display unit at a transparency between the transparency for menu operation and the transparency for writing.

5. The handwritten information input apparatus according to claim 2,
   wherein the coordinate input unit comprises a tablet capable of remote sensing, and detects coordinates of a position of the pointing device before the designating of the coordinates with the pointing device, and
   in the case where the coordinates of the position detected by the coordinate input unit is within or in the vicinity of a display region of the menu image, the menu display changing unit sets the transparency of the menu image displayed by the menu display unit at a transparency between the transparency for menu operation and the transparency for writing.

6. The handwritten information input apparatus according to claim 2, wherein during a period of time between starting of the acquiring of the coordinate data by the coordinate input unit and generation of the judgment by the handwritten input detection unit as to whether the operator is inputting a handwritten pattern or is pointing at the menu, the menu display changing unit sets the transparency of the menu image displayed by the menu display unit at a transparency between the transparency for menu operation and the transparency for writing.

7. The handwritten information input apparatus according to claim 1, wherein the handwritten input detection unit judges whether the operator is inputting a handwritten pattern or is pointing at the menu, based on at least one of the following criteria as the judgment criteria:
   a starting position of a stroke is within a display region of the menu image or not;
   a distance from the starting position of the stroke to a current position is not less than a predetermined threshold value or not;
   a length of a track from the starting position of the stroke to the current position is not less than a predetermined threshold value or not;
   a writing time of the track from the starting position of the stroke to the current position is not less than a predetermined threshold value or not;
   an immediately preceding stroke is a handwritten pattern or not; and
   inputting of the stroke starts within a predetermined time after completion of input of the immediately preceding stroke or not.

8. The handwritten information input apparatus according to claim 1,
   wherein the handwritten input detection unit judges whether the operator is inputting a handwritten pattern or is pointing at the menu, based on at least one of the following criteria as the judgment criteria: a distance from a starting position of a stroke to a current position is not less than a predetermined threshold value or not; and a length of a track from the starting position of the stroke to the current position is not less than a predetermined threshold value or not, and
   if an immediately preceding stroke is a handwritten pattern and inputting of the stroke starts within a predetermined time after completion of input of the immediately preceding stroke, values of the threshold values are changed.

9. A recording medium having stored thereon a program that controls operations of a handwritten information input apparatus comprising a display unit having a screen and a coordinate input unit that acquires coordinate data of a position on the screen designated by an operator with a pointing device, wherein the program makes a processor of the handwritten information input apparatus execute a procedure comprising:

a data processing process of processing data to be displayed on the screen;

a menu display process of making the screen display a menu image;

a handwritten input detection process of making a judgment whether the operator is inputting a handwritten pattern or is pointing at a menu based on the coordinate data acquired by the coordinate input unit and predetermined judgment criteria;

a menu display changing process of changing a transparency of the menu image displayed on the screen in accordance with a result of the judgment by the handwritten input detection process;

a menu operation process of performing a process associated with a menu item in the menu image in accordance with the coordinate data acquired by the coordinate input unit; and a menu operation switching process of, in the case where the handwritten input detection process judges that the operator is inputting a handwritten pattern, disabling the menu operation process and in the case where the handwritten input detection process judges that the operator is pointing at the menu, enabling the menu operation process.

* * * * *